(12) United States Patent
Shao et al.

(10) Patent No.: US 12,534,865 B2
(45) Date of Patent: Jan. 27, 2026

(54) DYNAMIC SETTLEMENT IN-SITU DYNAMIC TEST BENCH AND TEST METHOD FOR FOUNDATION SOIL

(71) Applicant: Xi'an University of Technology, Xi'an (CN)

(72) Inventors: Shengjun Shao, Xi'an (CN); Shuai Shao, Xi'an (CN); Jiang Wu, Xi'an (CN); Xiaowu Ma, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 291 days.

(21) Appl. No.: 18/229,714

(22) Filed: Aug. 3, 2023

(65) Prior Publication Data
US 2024/0068192 A1 Feb. 29, 2024

(51) Int. Cl.
*E02D 1/02* (2006.01)
*G01N 29/12* (2006.01)
*G01N 29/44* (2006.01)

(52) U.S. Cl.
CPC ............ *E02D 1/022* (2013.01); *G01N 29/12* (2013.01); *G01N 29/44* (2013.01); *E02D 2600/10* (2013.01); *G01N 2291/014* (2013.01)

(58) Field of Classification Search
CPC ....... E02D 1/022; E02D 2600/10; E02D 1/00; G01N 29/12; G01N 29/44; G01N 2291/014
See application file for complete search history.

(56) References Cited

U.S. PATENT DOCUMENTS

2017/0138828 A1* 5/2017 Ellington ............... G01N 33/24

FOREIGN PATENT DOCUMENTS

| CN | 111648341 A | * | 9/2020 | ............... G01N 3/02 |
| CN | 114154320 A | * | 3/2022 | ............... E02D 1/00 |
| CN | 117090182 A | * | 11/2023 | ............. E02D 3/046 |
| EP | 3901374 A1 | * | 10/2021 | ............... E02D 1/08 |

* cited by examiner

*Primary Examiner* — Francis C Gray
(74) *Attorney, Agent, or Firm* — Addison D. Ault; IPGentleman Intellectual Property Services, LLC

(57) ABSTRACT

An in-situ dynamic settlement test bench and method for the foundation soil is provided. The in-situ dynamic settlement test bench includes a vibration table system, a sensor embedded in the foundation soil, and a water injection trench around the foundation soil. A horizontal vibration load is applied to the lower foundation soil at an in-situ testing site by means of a vibration table, and the dynamic response of the foundation soil is measured through the sensors embedded in different positions, to reflect the seismic settlement deformation of the soil body. Dynamic settlement tests on soils include indoor dynamic simple shear, triaxial and torsional shear tests. A method is proposed for measuring the dynamic response and settlement deformation of the foundation soil by using a vibrator's vibration action on an in-situ soil column. Measurements of the acceleration response and seismic settlement deformation are taken for the foundation soil under in-situ condition.

7 Claims, 5 Drawing Sheets

DYNAMIC SETTLEMENT IN-SITU DYNAMIC TEST BENCH AND TEST METHOD FOR FOUNDATION SOIL

CROSS REFERENCE TO THE RELATED APPLICATIONS

This application is based upon and claims priority to Chinese Patent Application No. 202211023532.8, filed on Aug. 24, 2022, the entire contents of which are incorporated herein by reference.

TECHNICAL FIELD

The invention presented belongs to the field of in-situ loess seismic subsidence testing, and specifically relates to an in-situ dynamic settlement test bench and method for foundation soil.

BACKGROUND

Loess exhibits significant structural breakability under dynamic loading due to its large pores, high void ratio, weak interparticle cementation, and the development of vertical structural microfractures. Settlement generally occurs as loess is subjected to dynamic loads, so settlement and other related hazards of soil structures are likely to occur in loess areas during moderate to strong earthquakes.

Dynamic triaxial, dynamic torsional shear, and dynamic simple shear apparatus are commonly adopted for the investigation of dynamic settlement of loess. The dynamic triaxial apparatus applies reciprocal shear stresses on a 45-degree inclined plane of a cylindrical specimen to simulate dynamic load action, but it is unable to replicate the rotation of the main stress axis. The dynamic torsional shear apparatus is capable of investigating the intrinsic structure of soil under complex stress conditions by simultaneously applying a vertical load and horizontal reciprocal torsional shear stresses on a hollow cylindrical specimen. However, it has drawbacks such as difficulty in forming hollow cylindrical specimens and uneven shear strain distribution. The dynamic simple shear apparatus can apply a vertical load and a horizontal shear load to the specimen simultaneously, with loading conditions similar to the seismic effects on actual engineering sites. which cannot achieve an effect as same as that of an in-situ test. In summary, the aforementioned apparatus are limited to indoor use and cannot fully replicate in-situ conditions.

Currently, there is no mature method available for conducting an in-situ dynamic settlement test on foundation soil. A method is proposed for testing the dynamic response and dynamic settlement of foundation soil by using a vibrator's vibration action on an in-situ soil column.

The acceleration response of foundation soil during an earthquake is essentially a result of displacement response and deformation induced destabilization. An estimation of the average peak value for structural seismic response can be achieved through a combination of the reaction spectrum method, vibration mode superposition principle and random vibration theory. The reaction spectrum method can be utilized to analyze the experimental results and determine whether the site meets seismic fortification intensity requirements.

SUMMARY

An objective of the presented invention is to provide an in-situ dynamic settlement test bench for foundation soil.

An objective of the presented invention is to provide an in-situ dynamic settlement test method for foundation soil that overcomes the limitation of existing methods, which cannot fully replicate in-situ testing conditions.

The first technical solution employed in the presented invention is an in-situ dynamic settlement test bench for foundation soil. Two column holes are drilled along the centerline of the foundation soil at an in-situ testing site. Multiple sets of displacement and acceleration sensors are uniformly distributed within each hole, arranged from top to bottom. Trenches are excavated on both sides of the holes and filled with water. A plastic waterproof film is placed over the foundation soil, upon which a vibration table is positioned.

The presented invention has the following features.

The vibration table comprises a base that is firmly connected to a vibration table foundation by means of bolt assembly, and two eccentric wheels are symmetrically arranged on both sides of the base, which are driven by an electric motor.

The displacement and acceleration sensors are encased in remolded soil and embedded within soil columns, with any remaining space in the column holes being filled with backfill soil.

A plastic waterproof film is laid around the foundation and the trenches.

Each column hole has a diameter of 20 mm and a depth of 10 m; the distance between the two column holes is 1 m; and each trench has a width of 0.5 m, a length of 3 m and a depth of 10 m, and the distance between any two adjacent displacement sensors is 2 m.

The second technical solution employed in the presented invention is an in-situ dynamic settlement test method for foundation soil, specifically including:

step 1: selecting the foundation soil at an in-situ testing site with a width of 3 m and a length of 3 m;

step 2. drilling two column holes, hole A and hole B, with a diameter of 20 mm and a depth of 10 m along the centerline of the foundation soil with a Luoyang shovel, the distance between the two holes is 1 m;

step 3: encasing the sensors in remolded soil, and embedding them into soil columns; and preparing ten soil columns, each with sensors arranged in two groups; then placing one column vertically at a distance of 10 m from each column hole, and backfilling the soil up to 8 m before placing the second column vertically, continuing this process until all sensors are installed.

step 4: laying a plastic waterproof film over the foundation soil, installing a vibration table and loading system for applying vibrational loads to the foundation soil, and interposing a plastic film cloth waterproof membrane between the vibration table's foundation and the foundation soil.

step 5: digging a trench with a width of 0.5 m, a length of 3 m and a depth of 10 m at the in-situ testing site to form a foundation soil column with a size of 2 m*2 m. A plastic waterproof film is then laid on the peripheries, bottoms, and walls of the trench;

step 6: performing a dynamic test for an undisturbed structural loess foundation under the $K_0$ state by using the above testing facility, where, $K_0$ is the static earth pressure coefficient, being defined as the ratio between lateral effective stress and vertical effective stress. A dynamic test on loess under the $K_0$ state refers to a test where the lateral strain equals zero. Recording the acceleration response and displacement generated during the dynamic settlement process by gradually increasing the seismic wave amplitude through acceleration sensors and displacement sensors; and computing the time history curves of velocities and accelerations for five points in a foundation based on the generated acceleration response and displacement data;

step 7: according to the acceleration response and displacement obtained in step 6, a dynamic equilibrium equation of a mass point system for the foundation soil can be derived using Duharmel's integral formula:

$$\ddot{x}(t)+2\beta\dot{x}(t)+\omega^2 x(t)=-\ddot{x}(t),$$

where, x(t) is the displacement of a single mass point system at any given time, ẋ(t) and ẍ(t) are the velocity and acceleration of the mass point system of the foundation soil at different positions, and t is the time. When the initial acceleration, ẍ₀(t), is non-zero, an integral expression can be derived as a solution to the equation:

$$x(t) = -\frac{1}{\omega_0}\int_0^1 \ddot{x}_0(\tau) e^{-\lambda\omega(t-\tau)}\sin\omega_0(t-\tau)d\tau;$$

where, τ represents instantaneous time, λ denotes damping ratio, ω is the natural vibration period of the test, ω₀ is the natural vibration frequency with damping, and x(t) is the displacement of a single mass point system at any given time;

changing the natural vibration frequency of vibration to generate velocity and acceleration time history curves at various frequencies; examining the relationship between accelerations and periods to derive an earthquake-induced acceleration response spectrum.

The presented invention has beneficial effects: according to the presented invention, a horizontal vibration load can be applied to the lower foundation soil at an in-situ testing site using a vibration table, and the dynamic response of the foundation soil can be measured by the sensors embedded in different positions. This approach enables accurate reflection of the seismic settlement deformation within the foundation soil.

Dynamic settlement tests on soil include indoor dynamic simple shear, triaxial and torsional shear test. However, there is no currently no established method for conducting an in-situ dynamic settlement test on foundation soils. The vibration generated by a vibrator is applied to an in-situ soil column in a dynamic soil test. The presented invention enables the measurement of the acceleration response and seismic settlement deformation of the foundation soil under in-situ condition, which holds significant practical implications for disaster prevention and control.

Figure 1:
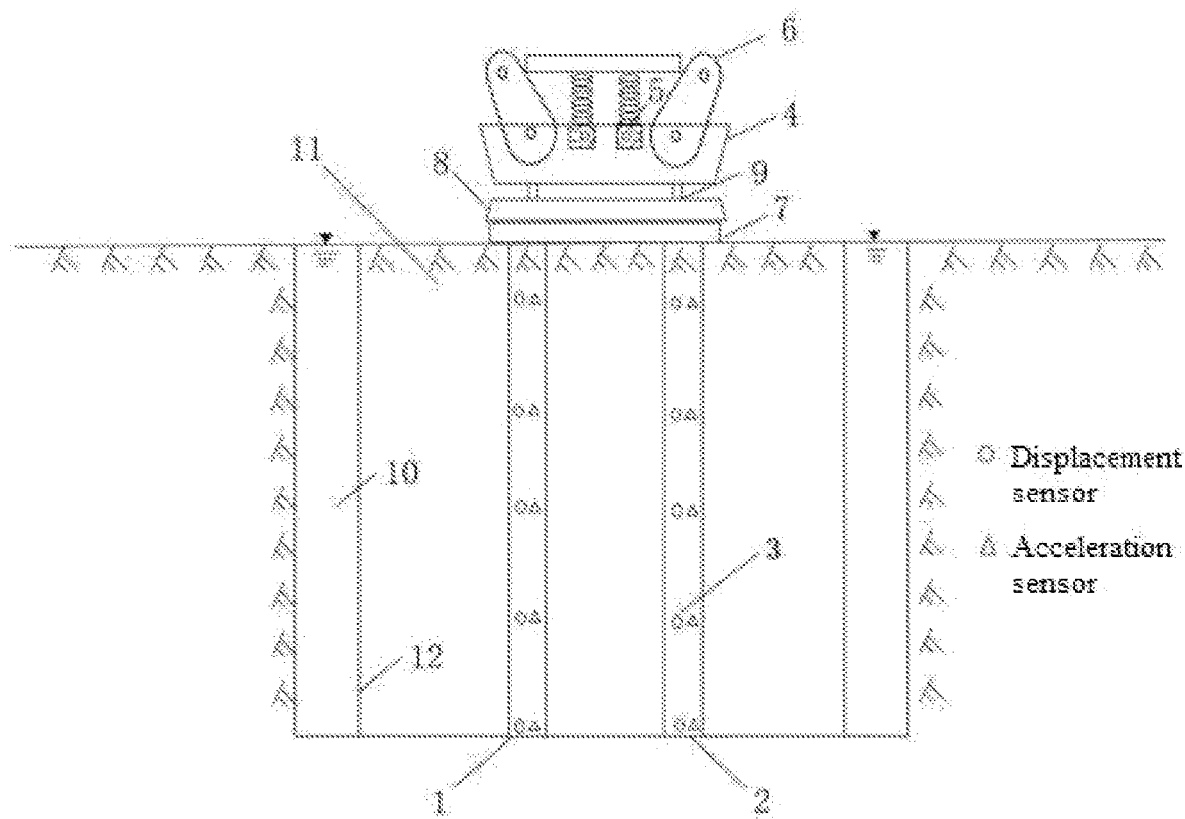
FIG. 1 is a schematic diagram of the structural design of a vibration test table according to the presented invention.
Figure 2:
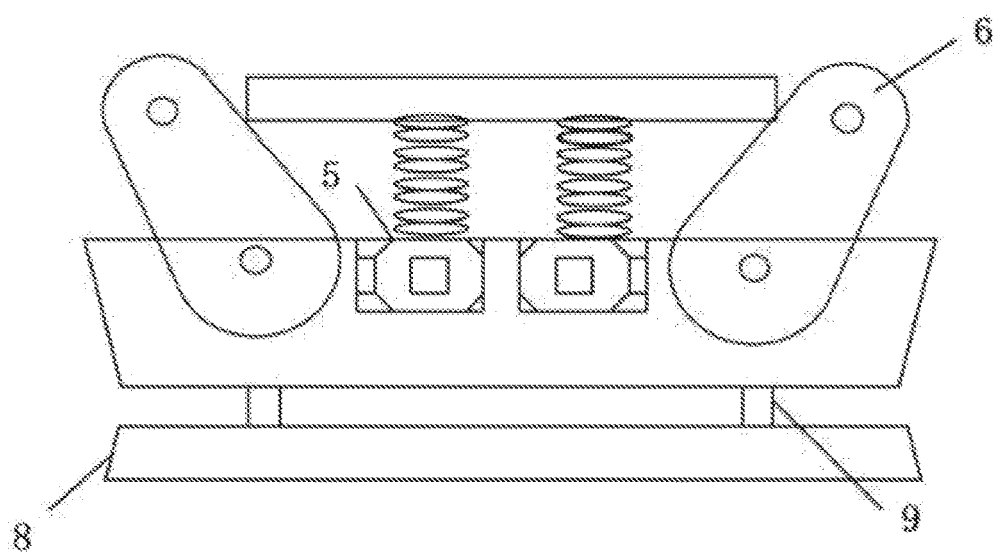
FIG. 2 is a schematic sectional view of a test according to the presented invention.
Figure 3A:
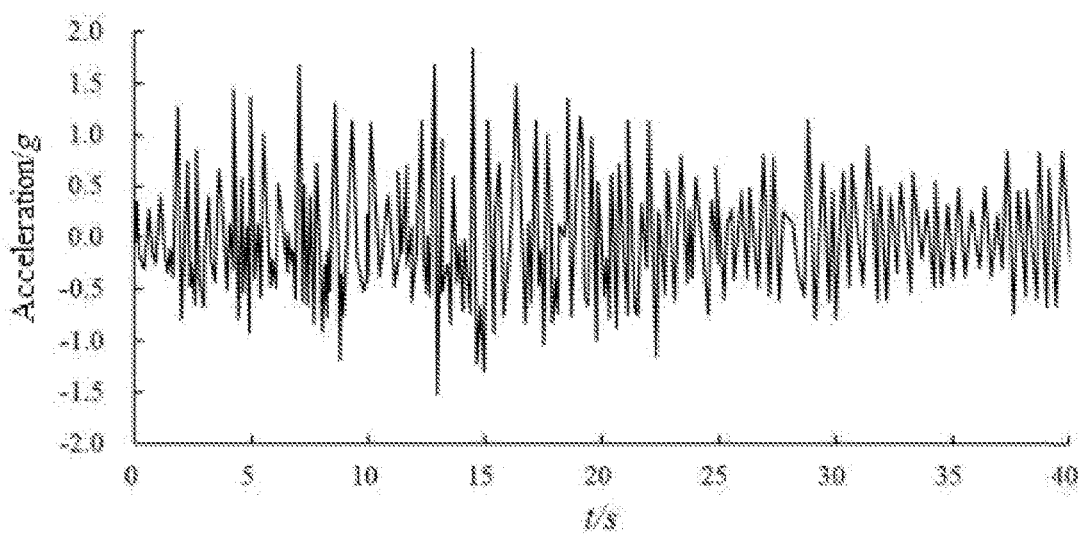
FIG. 3A is a time history curve of acceleration at monitoring point A1 when the peak acceleration is 0.3 g according to the presented invention.
Figure 3B:
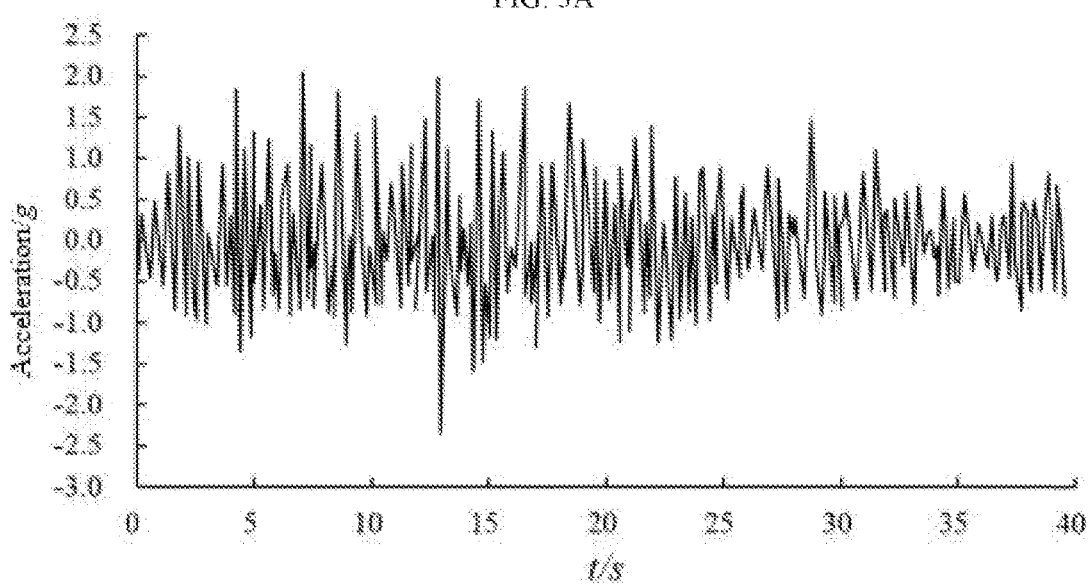
FIG. 3B is a time history curve of acceleration at monitoring point A1 when the peak acceleration is 0.5 g according to the presented invention.
Figure 3C:
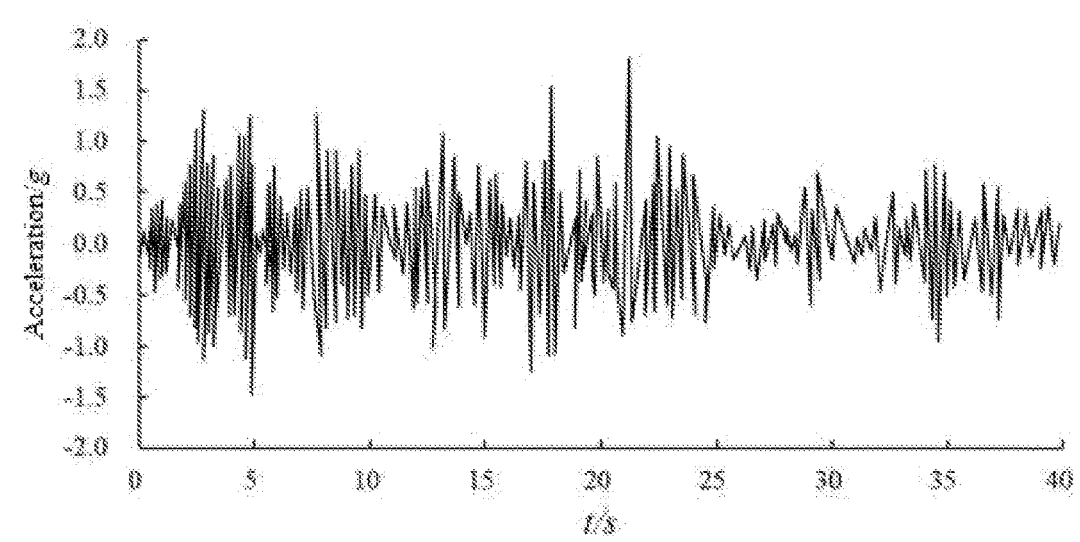
FIG. 3C is a time history curve of acceleration at monitoring point A2 when the peak acceleration is 0.3 g according to the presented invention.
Figure 3D:
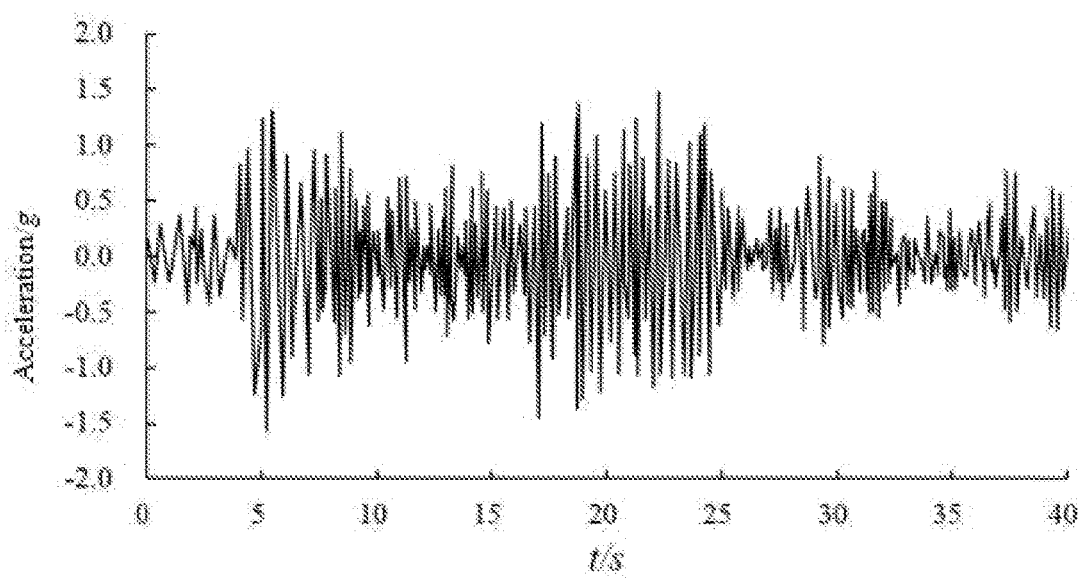
FIG. 3D is a time history curve of acceleration at monitoring point A2 when the peak acceleration is 0.5 g according to the presented invention.
Figure 3E:
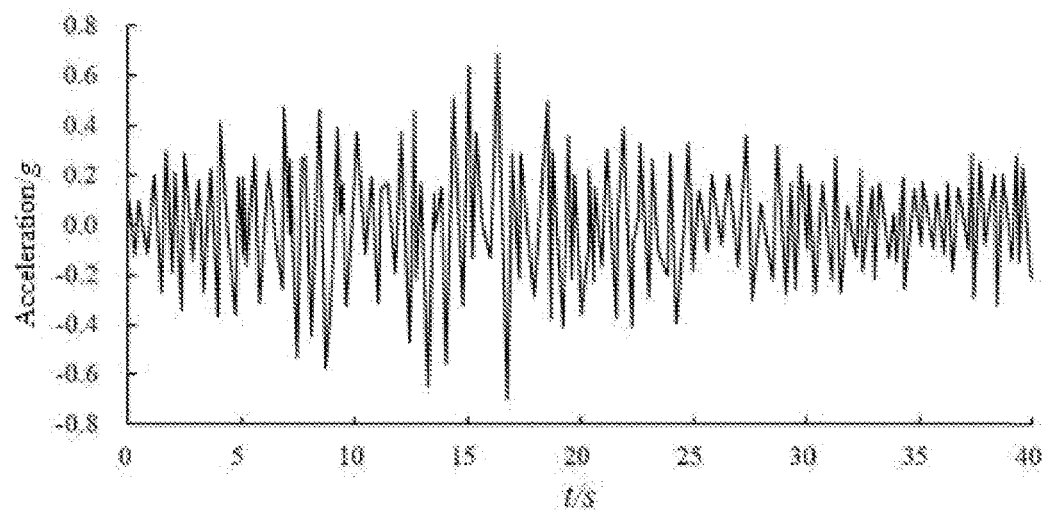
FIG. 3E is a time history curve of acceleration at monitoring point A3 when the peak acceleration is 0.3 g according to the presented invention.
Figure 3F:
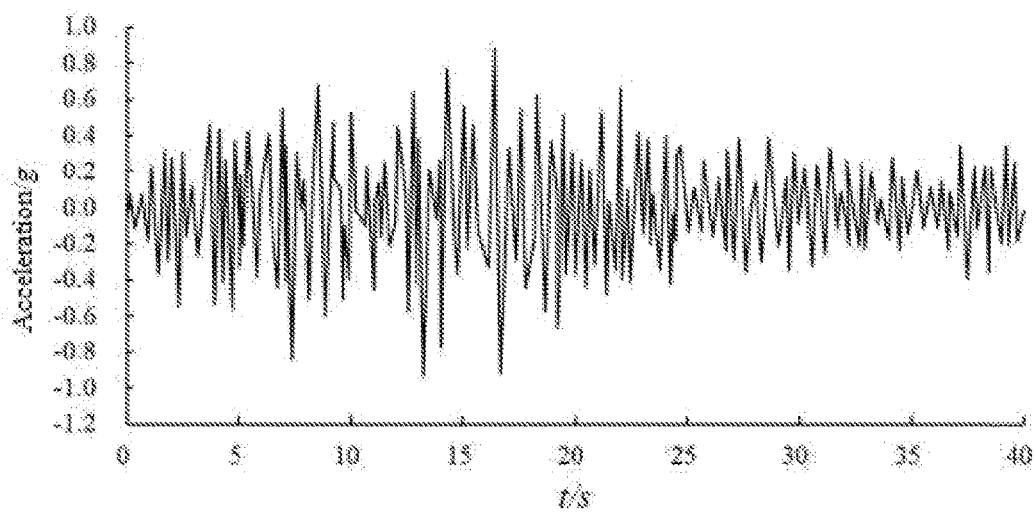
FIG. 3F is a time history curve of acceleration at monitoring point A3 when the peak acceleration is 0.5 g according to the presented invention.
Figure 3G:
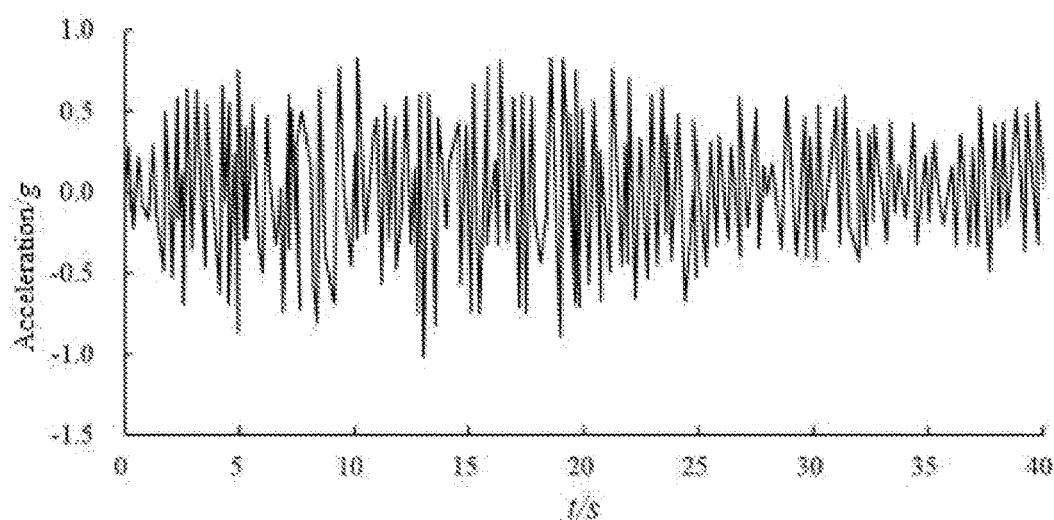
FIG. 3G is a time history curve of acceleration at monitoring point A4 when the peak acceleration is 0.3 g according to the presented invention.
Figure 3H:
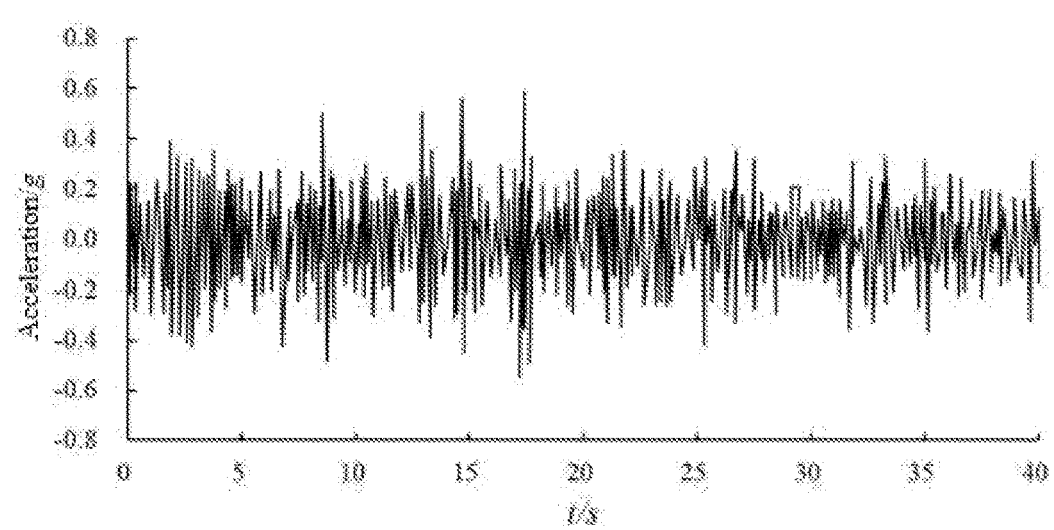
FIG. 3H is a time history curve of acceleration at monitoring point A4 when the peak acceleration is 0.5 g according to the presented invention.
Figure 3I:
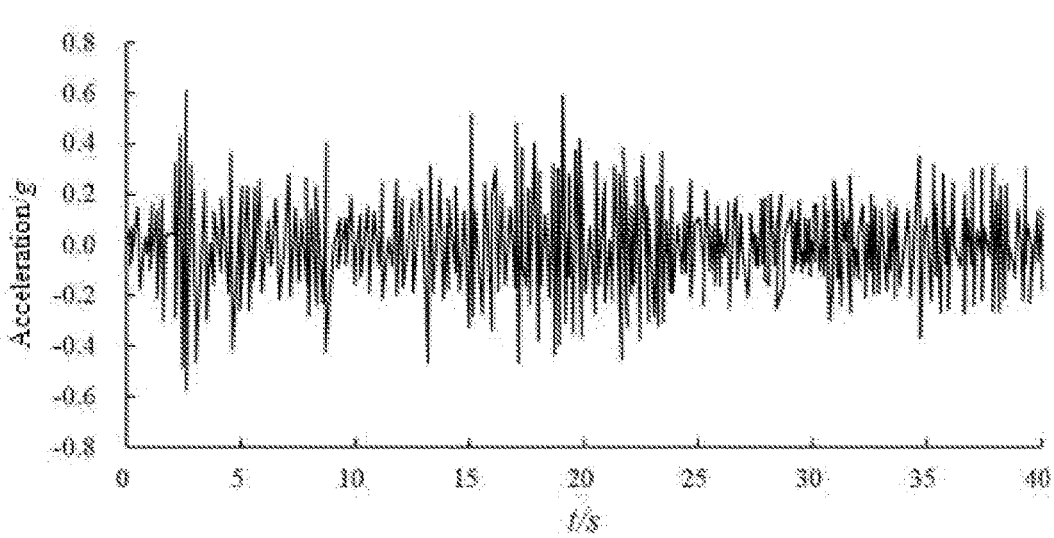
FIG. 3I is a time history curve of acceleration at monitoring point A5 when the peak acceleration is 0.3 g according to the presented invention.
Figure 3J:
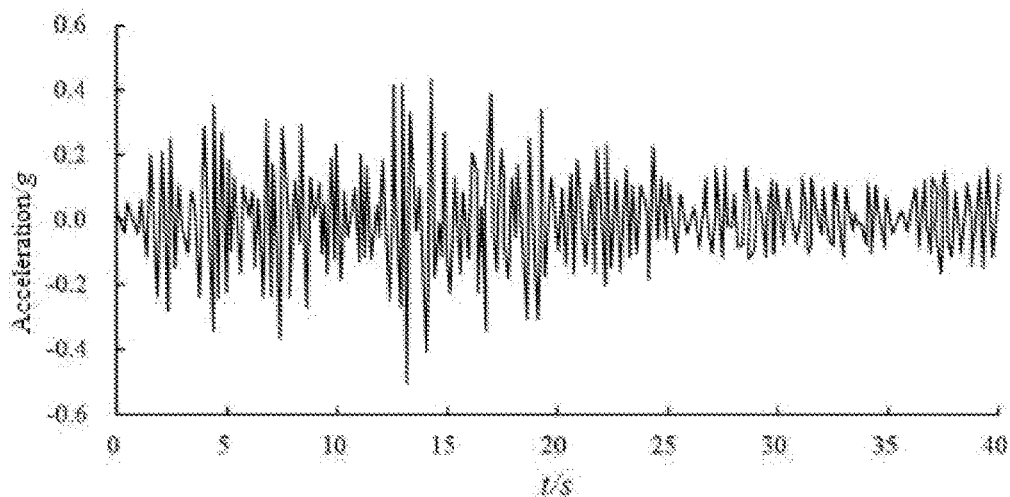
FIG. 3J is a time history curve of acceleration at monitoring point A5 when the peak acceleration is 0.5 g according to the presented invention.

In the figures, 1. column hole a, 2. sensor, 3. sensor, 4. vibration table, 5. electric motor, 6. eccentric wheel, 7. plastic waterproof film, 8. vibration table foundation, 9. bolt assembly, 10. trench, 11. foundation soil column, and 12. plastic waterproof film.

DETAILED DESCRIPTION OF THE EMBODIMENTS

To provide a clearer understanding of the objectives and technical solutions of the invention, detailed descriptions and embodiments will be presented with drawings.

According to a dynamic settlement in-situ dynamic test bench for foundation soil in the present invention, two column holes 1 are drilled on a center line of foundation soil of an in-situ test site, a plurality of sets of displacement sensors 2 and acceleration sensors 3 are uniformly distributed in each column hole 1 in sequence from top to bottom, trenches 10 are arranged on two sides of the column holes 1 separately, and the trenches 10 are filled with water; and a plastic waterproof film 7 is laid on a top of the foundation soil, and a vibration table is arranged on the plastic waterproof film 7.

The vibration table includes a base 4, and the base 4 is fixedly connected to a vibration table foundation 8 by means of a bolt assembly 9; and eccentric wheels 6 are symmetrically arranged on two sides of the base 4, and the two eccentric wheels 6 are in driving connection by means of an electric motor 5.

The displacement sensors 2 and the acceleration sensors 3 are each wrapped in remolded soil and cut into soil columns; and a remaining space in each column hole is backfilled with backfill soil.

A plastic waterproof film is laid around a foundation and the trenches 10.

Each column hole 1 has a diameter of 20 mm and a depth of 10 m; a distance between the two column holes is 1 m;

and each trench has a width of 0.5 m, a length of 3 m and a depth of 10 m, and a height distance between adjacent displacement sensors 2 is 2 m.

A dynamic settlement in-situ dynamic test method for foundation soil in the present invention specifically includes:
- step 1: set the foundation soil with a width of 3 m and a length of 3 m in an in-situ test site;
- step 2: drill a hole A and a hole B with a diameter of 20 mm and a depth of 10 m on a center line of foundation soil with a Luoyang shovel, where a distance between the two holes is 1 m;
- step 3: wrap sensors in remolded soil, cut the sensors into soil columns, and prepare ten soil columns with the sensors in two groups; and place one soil column vertically at 10 m of each column hole, backfill soil to 8 m, then place the second soil column vertically, backfill soil to 6 m, and so on until the last sensor is placed;
- step 4: lay a plastic waterproof film on a top of the foundation soil, arrange a vibration table and a loading system of a vibration load on the foundation soil, and arrange a waterproof film made of plastic film cloth between the vibration table foundation and the foundation soil;
- step 5: dig a trench with a width of 0.5 m, a length of 3 m and a depth of 10 m in the in-situ test site, form a foundation soil column with a size of 2 m*2 m, and lay a plastic waterproof film on peripheries and bottoms of the foundation soil and a trench wall;
- step 6: perform a dynamic test for an undisturbed structural loess foundation under a state $K_0$ by means of the above test facility, where
  the state $K_0$ is: $K_0$ is a static earth pressure coefficient $K_0$ being a ratio of a lateral effective stress state to a vertical effective stress state, and a loess dynamic experiment under the state $K_0$ is a test corresponding to a condition that a lateral strain is 0; record an acceleration response and displacement generated in a dynamic settlement process through a method of increasing an seismic wave amplitude step by step and by means of acceleration sensors and displacement sensors; and compute time history curves of velocities and time history curves of accelerations of five points in a foundation according to the generated acceleration response and the displacement; and
- step 7: according to the acceleration response and the displacement obtained in step 6, obtain a dynamic equilibrium equation of a mass point system of the foundation soil by means of a Duharmel integral formula, where the dynamic equilibrium equation of the mass point system of the foundation soil is:

$$\ddot{x}(t)+2\beta\dot{x}(t)+\omega^2 x(t)=-\ddot{x}(t).$$

where, $x(t)$ is displacement of a single mass point system at any time, $\dot{x}(t)$ is a velocity of the mass point system of the foundation soil at different positions, $\ddot{x}(t)$ is an acceleration of the mass point system of the foundation soil at different positions, and t is any time; and when an initial acceleration $\ddot{x}_0(t)$ is not 0, an integral expression of a solution of the equation is $$x(t)=-\frac{1}{\omega_0}\int_0^t \ddot{x}_0(\tau)e^{-\lambda\omega(t-\tau)}\sin\omega_0(t-\tau)d\tau;$$

where $\tau$ is an instantaneous time, $\lambda$ is a damping ratio, $\omega$ is a natural vibration period of the test, $\omega_0$ is a natural vibration frequency with damping, and $x(t)$ is displacement of the single mass point system at any time, and $\dot{x}(t)$ is a velocity of the mass point system of the foundation soil at different positions;

change a natural vibration frequency of vibration, to obtain time history curves of velocities and time history curves of accelerations under different frequencies; and analyze a relation between the accelerations and a period, to obtain an acceleration response spectrum under an earthquake.

EMBODIMENT

A pretest is performed according to the above test steps. A dynamic amplification factor may be reflected by ratios of peak accelerations at different depths of foundation soil to peak accelerations input to a table, where the peak accelerations input to a table are peak accelerations of a vibration table after the experiment is started.

FIGS. 3A, 3C, 3E, 3G and 3I show time history curves of accelerations at monitoring points A1, A2, A3, A4 and A5 at different depths respectively when a peak acceleration is 0.3 g.

FIGS. 3B, 3D, 3F, 3H and 3J show time history curves of the accelerations at the monitoring points A1, A2, A3, A4 and A5 at different depths respectively when the peak acceleration is 0.5 g.

A1, A2, A3, A4 and A5 are positions of 5 groups of acceleration sensors from bottom to top in sequence.

Figure 4A:
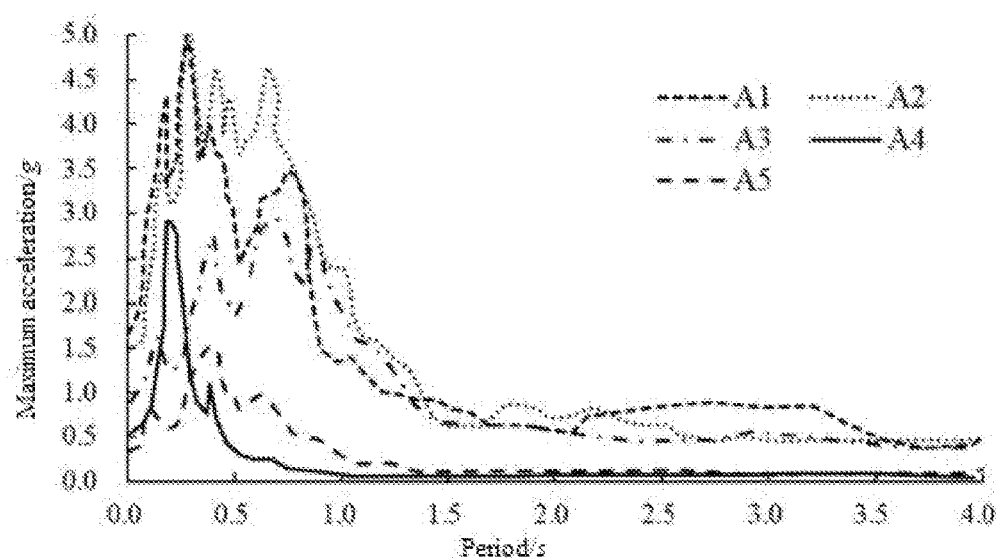
FIG. 4A is a response spectrum curve graph of each monitoring point at different periods when the peak acceleration is 0.3 g according to the presented invention.
Figure 4B:
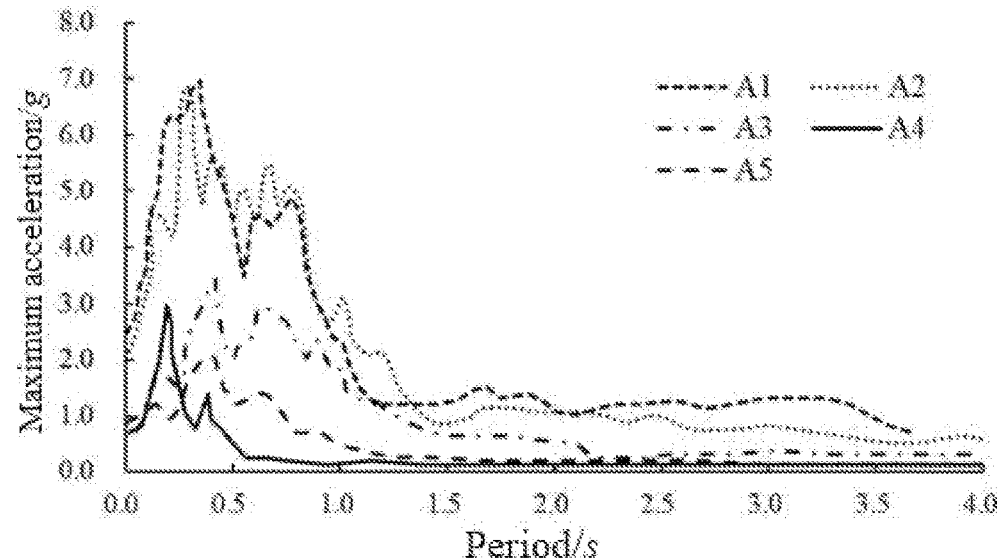
FIG. 4B is a response spectrum curve graph of each monitoring point at different periods when the peak acceleration is 0.5 g according to the presented invention.

A natural vibration frequency wo is changed to obtain time history curves of accelerations under different frequencies. A relation between the accelerations and a period is analyzed to obtain an acceleration response spectrum (as shown in FIGS. 4A and 4B) under an earthquake. In the formula, the natural vibration frequency is a free vibration frequency of a loess foundation during the test.

What is claimed is:

1. A dynamic settlement in-situ dynamic test bench for foundation soil, wherein two column holes are drilled on a center line of foundation soil of an in-situ test site, a plurality of sets of displacement sensors and acceleration sensors are uniformly distributed in each of the two column holes in sequence from top to bottom, trenches are arranged on two sides of the two column holes separately, and the trenches are filled with water; and a first plastic waterproof film is laid on a top of the foundation soil, avoiding test deviations caused by soil property changes, and a vibration table is arranged on the first plastic waterproof film to apply horizontal vibration loads to the foundation soil and simulate seismic dynamic effects.

2. The dynamic settlement in-situ dynamic test bench for the foundation soil according to claim 1, wherein the vibration table comprises a base, and the base is fixedly connected to a vibration table foundation by a bolt assembly; and two eccentric wheels are symmetrically arranged on two sides of the base, and the two eccentric wheels are in driving connection by means of an electric motor to generate periodic horizontal vibration through the rotation of the eccentric wheels, providing stable dynamic loads required for the test.

3. The dynamic settlement in-situ dynamic test bench for the foundation soil according to claim 1, wherein the displacement sensors and the acceleration sensors are each wrapped in remolded soil that has the same physical properties as the in-situ foundation soil and cut into soil columns matching the diameter of the column holes; and a remaining space in each of the two column holes is backfilled with backfill soil.

4. The dynamic settlement in-situ dynamic test bench for the foundation soil according to claim 1, wherein a second plastic waterproof film is laid around a foundation and the trenches, covering the outer walls and bottoms of the trenches and the peripheral surface of the foundation to form a closed waterproof structure and isolate external water interference.

5. The dynamic settlement in-situ dynamic test bench for the foundation soil according to claim 1, wherein each of the two column holes has a diameter of 20 mm and a depth of 10 m, and the depth of the column holes is consistent with the depth of the foundation soil layer to be tested to ensure the sensors can monitor the dynamic response of the target soil layer; a distance between the two column holes is 1 m; and the spacing is set to avoid mutual interference between the sensors in the two column holes while ensuring comprehensive coverage of the test area; Each of the trenches has a width of 0.5 m, a length of 3 m and a depth of 10 m, and the depth of the trenches is the same as that of the column holes to form a complete isolation boundary for the test soil mass, and a height distance between adjacent displacement sensors along the vertical axis of the column holes is 2 m, and the uniform spacing ensures that the dynamic settlement law of the foundation soil can be analyzed in segments along the depth direction.

6. A dynamic settlement in-situ dynamic test method for foundation soil, comprising:
    step 1: setting the foundation soil with a width of 3 m and a length of 3 m in an in-situ test site;
    step 2: drilling a first column hole and a second column hole with a diameter of 20 mm and a depth of 10 m on a center line of foundation soil with a Luoyang shovel, wherein a distance between the first column hole and the second column hole is 1 m;
    step 3: wrapping sensors in remolded soil, cutting the sensors into soil columns, and preparing ten soil columns with the sensors in two groups; and placing a first soil column vertically at 10 m of each of the first column hole and the second column hole, backfilling soil to 8 m, then placing a second soil column vertically, backfilling soil to 6 m, and so on until the last sensor is placed;
    step 4: laying a first plastic waterproof film on a top of the foundation soil, arranging a vibration table and a loading system of a vibration load on the foundation soil, and arranging a waterproof film made of plastic film cloth between the vibration table foundation and the foundation soil;
    step 5: digging a trench with a width of 0.5 m, a length of 3 m and a depth of 10 m in the in-situ test site, specifically, the trench is excavated along the outer edge of the 3 m×3 m foundation soil set in step 1: two trenches are dug parallel to the 3 m-length side of the 3 m×3 m foundation soil (each trench is 3 m long, 0.5 m wide, 10 m deep), and two trenches are dug parallel to the 3 m-width side (each trench is also 3 m long, 0.5 m wide, 10 m deep), so that the trenches form a "frame" around the 3 m×3 m foundation soil; after excavation, the soil area enclosed by the trench frame is the remaining foundation soil, and since the total width/length of the original 3 m×3 m foundation soil minus the width of two opposite trenches (0.5 m×2=1 m) equals 2 m, the enclosed soil area forms a foundation soil column with a size of 2 m×2 m (depth consistent with the trench depth of 10 m), forming a foundation soil column with a size of 2 m*2 m, and laying a second plastic waterproof film on peripheries and bottoms of the foundation soil (i.e., the peripheries and bottom of the 2 m×2 m foundation soil column) and a trench wall (including the inner side walls and bottom of the excavated trench, ensuring the film is tightly attached to avoid gaps that cause water seepage or soil disturbance);

step 6: performing a dynamic test for an undisturbed structural loess foundation under a state $K_0$ by the above test facility, wherein the state $K_0$, which is specifically defined as the ratio of lateral effective stress (denoted as σ'h, referring to the effective stress acting on the side surface of the 2 m×2 m foundation soil column formed in step 5, consistent with the lateral stress of the in-situ foundation soil) to vertical effective stress (denoted as σ'v, referring to the effective stress acting on the top surface of the 2 m×2 m foundation soil column, equal to the in-situ overburden stress of the foundation soil at the test site, i.e., the weight of the soil layer above the test soil column), and the mathematical expression is $K_o=σ'h/σ'v$; recording an acceleration response generated in a dynamic settlement process through a method of increasing an seismic wave amplitude step by step and by acceleration sensors and displacement sensors; and computing time history curves of accelerations of five points in a foundation according to the acceleration response and a displacement;
    step 7: changing a natural vibration frequency of vibration to obtain time history curves of velocities and time history curves of accelerations under different frequencies; and analyzing a relation between the accelerations and a period to obtain an acceleration response spectrum under an earthquake.

7. The dynamic settlement in-situ dynamic test method for the foundation soil according to claim 6, wherein according to the acceleration response and the displacement obtained in step 6, a dynamic equilibrium equation of a mass point system of the foundation soil is obtained by a Duharmel integral formula, wherein the dynamic equilibrium equation of the mass point system of the foundation soil is:

$$\ddot{x}(t)+2\beta\dot{x}(t)+\omega^2 x(t)=-\ddot{x}(t),$$

wherein, x(t) is displacement of a single mass point system at any time the "single mass point system" refers to a simplified mechanical analysis model designed for the in-situ dynamic test of foundation soil in this invention: it corresponds to the foundation soil at each layered monitoring depth where sensors are embedded (as set in step 3, i.e., the soil layer segments at the depths of 2 m, 4 m, 6 m, 8 m, 10 m where the ten soil columns with sensors are placed), and each of these soil layer segments is simplified into an independent "mass point" in the mechanical model; This simplification is to match the technical solution of layered monitoring in step 3 and step 6 (computing time history curves of five points in the foundation), so that the dynamic equilibrium equation can be applied to analyze the displacement, velocity and acceleration response of the foundation soil at each individual monitoring depth separately, avoiding the complexity of integral analysis of the entire foundation soil mass and ensuring the accuracy of dynamic response calculation for each depth layer, $\dot{x}(t)$ is a velocity of the mass point system of the foundation soil at different positions, ẍ(t) is an acceleration of the mass point system of the foundation soil at different positions, and t is any time; and when an initial acceleration $\ddot{x}_0(t)$ is not 0, an integral expression of a solution of the dynamic equilibrium equation is $$x(t) = -\frac{1}{\omega_0} \int_0^1 \ddot{x}_0(\tau) e^{-\lambda \omega(t-\tau)} \sin\omega_0(t-\tau) d\tau;$$

wherein $\tau$ is an instantaneous time, $\lambda$ is a damping ratio, $\omega$ is a natural vibration period of the test, $\omega_0$ is a natural vibration frequency with damping, and x(t) is displacement of the single mass point system at any time.

\* \* \* \* \*